(12) United States Patent
Argovitz

(10) Patent No.: US 7,624,589 B1
(45) Date of Patent: Dec. 1, 2009

(54) METHOD AND APPARATUS FOR COOLING SWIMMING POOL WATER

(76) Inventor: Rick Martin Argovitz, 4610 Meadows Edge La., Houston, TX (US) 77084

( * ) Notice: Subject to any disclaimer, the term of this patent is extended or adjusted under 35 U.S.C. 154(b) by 752 days.

(21) Appl. No.: 10/945,143

(22) Filed: Sep. 20, 2004

(51) Int. Cl.
*F28D 5/00* (2006.01)
(52) U.S. Cl. .............................. 62/304; 62/121; 62/314; 62/DIG. 11
(58) Field of Classification Search .................... 62/121, 62/304, 314, DIG. 11
See application file for complete search history.

(56) References Cited

U.S. PATENT DOCUMENTS

| | | | |
|---|---|---|---|
| 4,189,791 A | | 2/1980 | Dundas |
| 5,084,217 A | * | 1/1992 | Dodds ........................ 261/36.1 |
| 5,349,829 A | * | 9/1994 | Tsimerman ................... 62/314 |
| 6,122,922 A | | 9/2000 | Conner |
| 6,128,792 A | * | 10/2000 | Mathews ........................ 4/508 |
| 6,138,294 A | | 10/2000 | Desjoyaux et al. |
| 6,338,256 B1 | * | 1/2002 | Tien ............................. 62/305 |
| 6,595,011 B1 | * | 7/2003 | Forgy ............................ 62/91 |
| 2001/0029625 A1 | | 10/2001 | Lynn |
| 2001/0047539 A1 | | 12/2001 | Lynn |

FOREIGN PATENT DOCUMENTS

JP 57169553 A2 10/1982

* cited by examiner

*Primary Examiner*—Frantz F Jules
*Assistant Examiner*—Azim Rahim
(74) *Attorney, Agent, or Firm*—Kenneth L Tolar

(57) ABSTRACT

A method and apparatus for cooling swimming pool water includes diverting a stream of swimming pool water to a distribution header. The distribution header includes a plurality of dispersing apertures for converting the stream of swimming pool water into a plurality of smaller streams. Positioned immediately beneath the distribution header is a fill medium through which the smaller streams of water pass where they are atomized into smaller droplets. An electric fan is positioned above the distribution header for forcing ambient air through the fill medium to invoke evaporative cooling of the atomized water. The resulting evaporatively cooled water is collected in a reservoir and returned to a swimming pool.

8 Claims, 2 Drawing Sheets

METHOD AND APPARATUS FOR COOLING SWIMMING POOL WATER

BACKGROUND OF THE INVENTION

The present invention relates to a method and apparatus for cooling swimming pool water.

DESCRIPTION OF THE PRIOR ART

A swimming pool is an excellent source of relief from the heat during summer months. In extremely hot climates, however, the swimming pool water can become so warm that any potential benefit is significantly diminished. Though many devices and methods exist in the prior art for heating swimming pools in colder climates, relatively few devices have been heretofore designed to cool swimming pools in warmer climates.

For example, U.S. Pat. No. 4,189,791 issued to Dundas discloses a swimming pool heating and cooling system including pumping ambient air through a submerged, perforated manifold tube. The resulting air bubbles ascend the swimming pool water resulting in heat exchange therebetween.

Japanese patent no. JP57169553A2 issued to Mitsunori discloses a swimming pool heating and cooling device including positioning underground pipes parallel to a swimming pool bottom. Cooling or heating air is diverted to the pipes.

U.S. Pat. No. 6,122,922 issued to Conner discloses an air and water cooling apparatus for efficiently cooling a structure.

U.S. Pat. No. 6,138,294 issued to Desjoyaux et al. discloses a compartmentalized pumping and filtering mechanism for a swimming pool.

U.S. published patent application no. 2001/0029625 filed on behalf of Lynn ('625) discloses a swimming pool heating and cooling system including diverting water through a waterfall at strategic times of the day to achieve maximum heat exchange with ambient air; a movable surface (i.e., a raft) is positioned below the waterfall to further maximize the heat transfer efficiency.

U.S. published patent application no. 2001/0047539 filed on behalf of Lynn discloses a swimming pool heating and cooling system similar to that disclosed in Lynn, supra.

Though a couple of devices cited above disclose means for cooling swimming pool water, most are expensive, complicated and cumbersome to install. Furthermore, the effectiveness of such methods is minimal. The present invention provides a cooling tower that can be easily coupled with an existing swimming pool recirculating water system; the cooling tower employs conventional evaporative cooling technology to conveniently and efficiently cool swimming pool water.

SUMMARY OF THE INVENTION

The present invention relates to a method and apparatus for cooling swimming pool water. The apparatus comprises an evaporative cooler including a hollow tower having an open upper end, one or more outer walls, a lower end and an interior chamber. Positioned near the upper end is a motor operated fan. Received within the tower interior at a predetermined distance beneath the fan is a rotary water distribution header having a plurality of dispensing apertures thereon. The header is preferably in fluid communication with the swimming pool recirculating water system. Immediately beneath the distribution header is a layer of fill medium having a predetermined height that atomizes falling water into droplets. Immediately beneath the fill medium is a reservoir for collecting water exiting the medium. A pump is positioned within the reservoir that operates intermittently to prevent the reservoir from overflowing.

The method according to the present invention includes diverting a stream of swimming pool water, preferably from the swimming pool filtering system, to the water header. The existing water pressure within the recirculating water system causes the header to rotate while dispensing streams of water through the apertures and onto the fill medium. The water streams are atomized as they traverse the medium so as to enlarge the surface area available for direct contact with ambient air. Contemporaneously, the electric fan is activated which pulls ambient air upwardly through the fill where it contacts the atomized water thereby initiating evaporative cooling. The resulting cooled water falls into the reservoir where it is returned to the swimming pool recirculating water system, or alternatively directly to the swimming pool basin.

It is therefore an object of the present invention to provide a method and apparatus that effectively and efficiently cools swimming pool water.

It is another object of the present invention to provide a method and apparatus for cooling swimming pool water that uses evaporative cooling principles to effectively and efficiently cool swimming pool water.

Other objects, features and advantages of the present invention will become readily apparent from the following detailed description of the preferred embodiment when considered with the attached drawings and the appended claims.

DESCRIPTION OF THE PREFERRED EMBODIMENT

A typical swimming pool includes a recirculating water system that diverts the swimming pool water to a filtering mechanism. The recirculating system includes a pump with a suction and return line coupled therewith. The pump typically transfers water from the swimming pool bottom, through the suction line to the filtering mechanism. The return line extends from the filtering mechanism to the pool basin for returning filtered water thereto.

Figure 1:
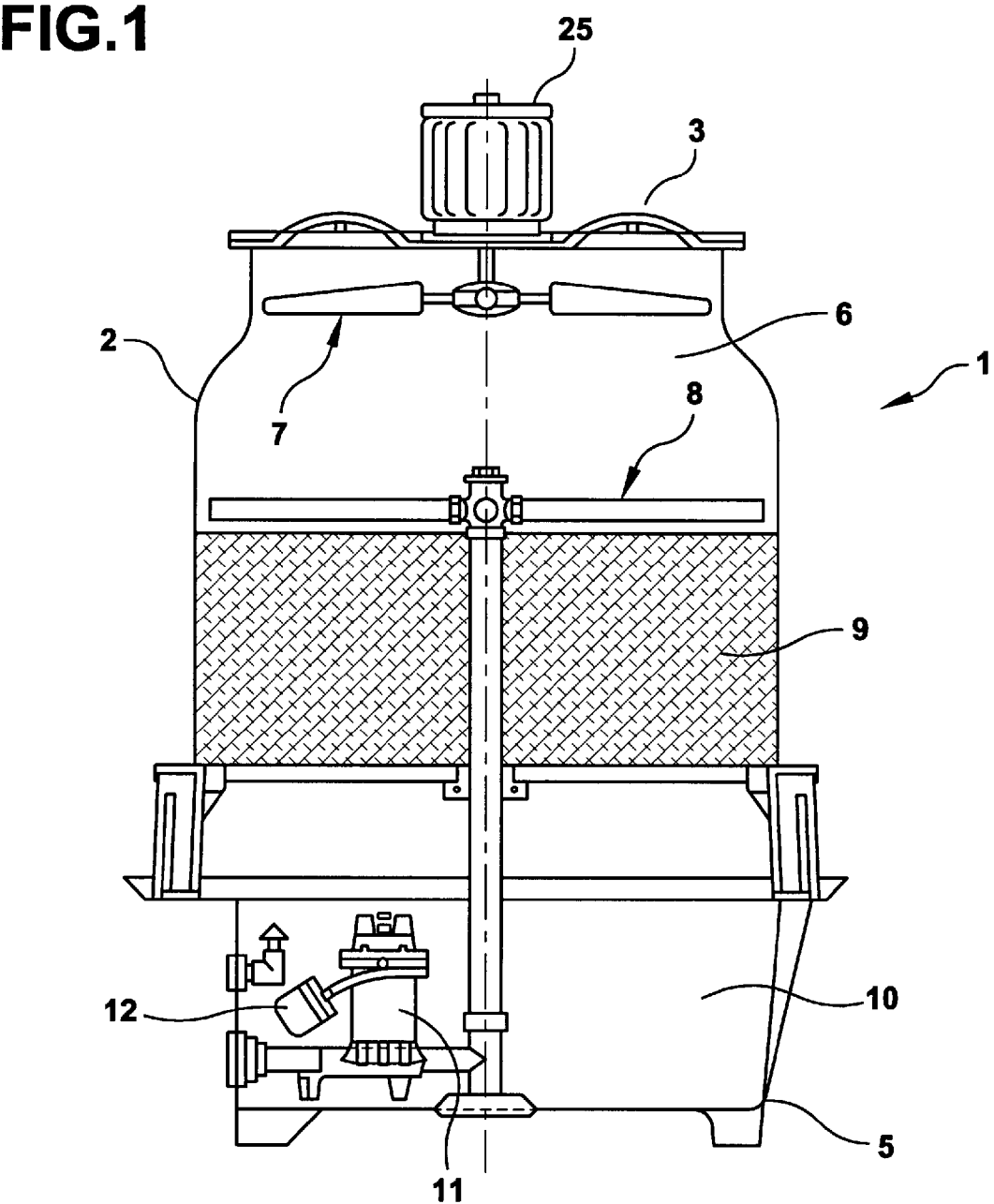
FIG. 1 is a cross-sectional view of the cooling apparatus according to the present invention.
Figure 2:
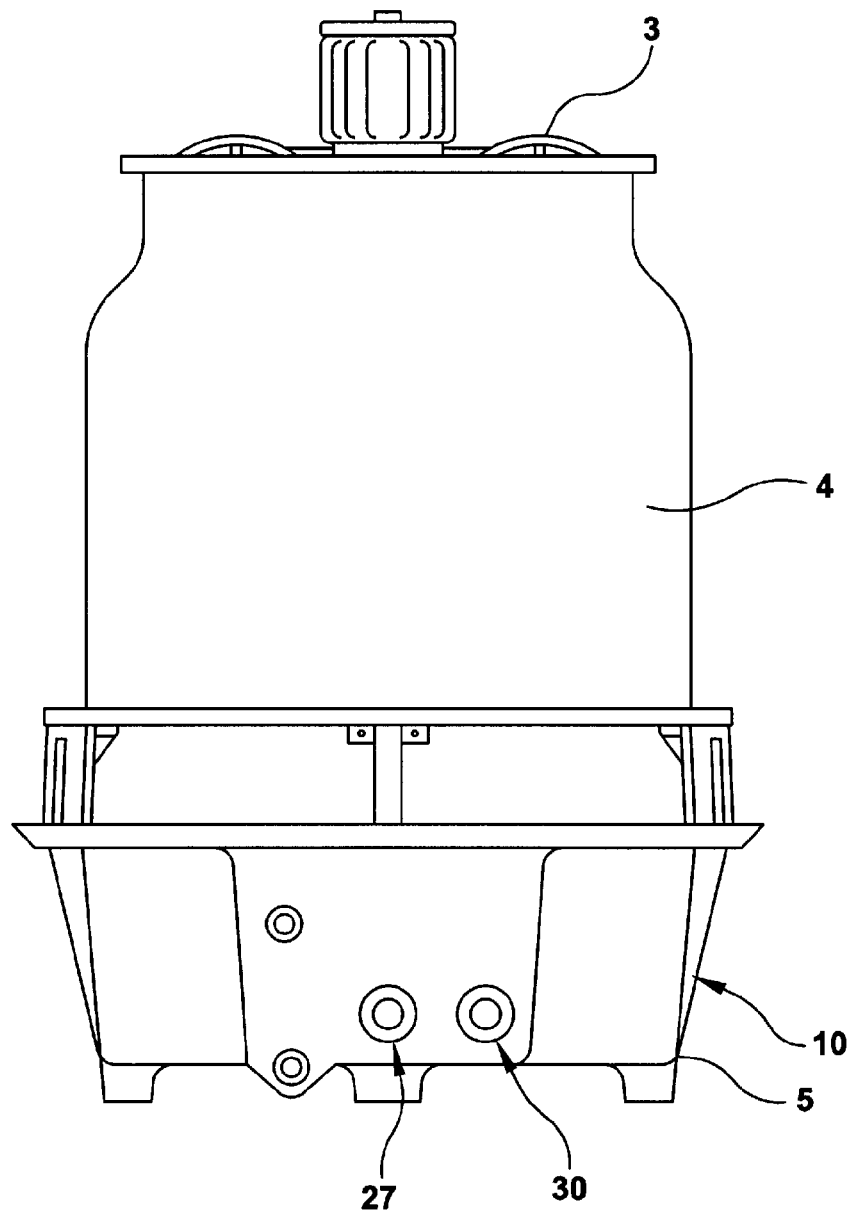
FIG. 2 is a plan view of the cooling apparatus according to the present invention.

Referring now to FIGS. 1 and 2, the present invention relates to a method and apparatus for cooling swimming pool water within a swimming pool of the type described above. The apparatus includes an evaporative cooler, depicted generally at 1, including a hollow tower 2 having an open upper end 3, one or more outer walls 4, a lower end 5 and an interior chamber 6. Positioned near the upper end is a motor 25 operated fan 7. Positioned within the tower interior at a predetermined distance beneath the fan is a rotary water distribution header 8 having a plurality of dispensing apertures thereon. The header is in fluid communication with the recirculating water return line.

Immediately beneath the distribution header is a layer of fill medium 9 having a predetermined height that atomizes falling streams of water into droplets. Proximal the lower end of the tower is a reservoir 10 for collecting water exiting the medium. The reservoir includes an inlet port 27 that is in fluid communication with the distribution header and an outlet port 30 that is in communication with the recirculating system suction line. Alternatively, a designated line extends from the tower outlet to the swimming pool basin, if for example, the cooling system is being installed simultaneously with the construction of a new pool.

A pump 11 is positioned within the reservoir that operates intermittently to prevent the reservoir from overflowing. The pump includes an exposed inlet and an outlet that is in fluid communication with the recirculating water suction line, or the designated line, mentioned supra. During normal operation, water is pulled through the reservoir pump 11 by the recirculating filter system pump and into the suction line for return to the swimming pool. Alternatively, the reservoir pump delivers it directly to the swimming pool basin via the designated line. The reservoir pump includes a float activated switch means 12 for activating the pump when the fluid level within the reservoir exceeds a predetermined level whereby the sump pump supplements the filtering system pump to lower the fluid level within the reservoir. Accordingly, valves are positioned on the tower inlet and outlet water lines which are adjusted to maintain a minimal water level within the reservoir so as not to cavitate the pool recirculating pump.

The method according to the present invention includes diverting a stream of swimming pool water, preferably from the swimming pool filtering system, to the water header. The existing water pressure within the recirculating water system causes the header to rotate while dispensing streams of water through the apertures and onto the fill medium. The water streams are atomized as they fall through the medium so as to enlarge the surface area available for direct contact with ambient air. Contemporaneously, the electric fan is activated which pulls ambient air upwardly through the fill medium where it contacts the atomized water thereby initiating evaporative cooling. The resulting cooled water falls into the reservoir where it is returned to the swimming pool recirculating water system.

The above described device is not limited to the exact details of construction and arrangement of parts provided herein. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. In combination with a swimming pool having a swim basin with water therein, a suction line extending from the basin to a filtering system and a return line extending from the filtering system to the basin, an apparatus for cooling water within the basin comprising:
   a hollow tower having an upper end, a lower end and an interior;
   a motorized fan positioned at the upper end of said tower;
   a water distribution header positioned beneath said fan, said distribution header in fluid communication with said return line, said header having a plurality of dispensing apertures thereon;
   a fill medium received within said tower interior and positioned beneath said header, said medium configured to atomize streams of water coming in contact therewith;
   a reservoir positioned beneath said medium, said reservoir in fluid communication with said basin whereby said fan pulls ambient air upwardly through said atomized streams of water to invoke evaporative cooling thereof allowing cooled water to be collected in said reservoir and redirected to said basin.

2. The apparatus according to claim 1 further comprising an overflow pump received within said reservoir for draining said reservoir in an overflow condition.

3. The apparatus according to claim 2 further wherein said pump includes an automated actuation means for automatically activating said pump when fluid within said reservoir exceeds a predetermined level.

4. A swimming pool cooling system comprising:
   a swimming pool having a swim basin with water therein;
   a suction line extending from the basin to a filtering system;
   a return line extending from the filtering system to the basin;
   a recirculating pump connected to said suction line and said return line for transferring water from said swim basin to a filtering system and back to said basin;
   a hollow tower having an upper end, a lower end and an interior;
   a motorized fan positioned at the upper end of said tower;
   a water distribution header positioned beneath said fan, said distribution header in fluid communication with said return line, said header having a plurality of dispensing apertures thereon;
   a fill medium received within said tower interior and positioned beneath said header, said medium configured to atomize streams of water coming in contact therewith;
   a reservoir positioned beneath said medium, said reservoir in fluid communication with said basin whereby said fan pulls ambient air upwardly through said atomized streams of water to invoke evaporative cooling thereof allowing cooled water to be collected in said reservoir and redirected to said swim basin.

5. The apparatus according to claim 4 further comprising an overflow pump received within said reservoir for draining said reservoir in an overflow condition, said overflow pump including an exposed inlet, and an outlet in fluid communication with said suction line.

6. The apparatus according to claim 5 further wherein said overflow pump includes an automated actuation means for automatically activating said pump when fluid within said reservoir exceeds a predetermined level.

7. The apparatus according to claim 6 wherein said automated actuation means for automatically activating said pump when fluid within said reservoir exceeds a predetermined level includes a float activated switch means on said reservoir pump for activating the pump when the fluid level within the reservoir exceeds a predetermined level whereby the overflow pump supplements the recirculating pump to lower the fluid level within the reservoir.

8. The apparatus according to claim 7 further comprising means for manually adjusting the minimal water level within the reservoir so as not to cavitate the swimming pool recirculating pump.

* * * * *